United States Patent [19]

Kitagawara et al.

[11] Patent Number: 5,570,605
[45] Date of Patent: Nov. 5, 1996

[54] TRANSMISSION ASSEMBLY FOR TRACTORS

[75] Inventors: Hiroshi Kitagawara; Keisaku Hikishima, both of Kobe, Japan

[73] Assignee: Kanzaki Kokyukoki Mfg. Co., Ltd., Amagasaki, Japan

[21] Appl. No.: 509,155

[22] Filed: Jul. 31, 1995

[30] Foreign Application Priority Data

Sep. 13, 1994 [JP] Japan .................. 6-244658
Sep. 16, 1994 [JP] Japan .................. 6-248766

[51] Int. Cl.$^6$ .............. B60K 17/08; B60K 17/06
[52] U.S. Cl. ....................... 74/15.63; 74/606 R
[58] Field of Search ................ 74/15.6, 15.63, 74/15.66, 606 R

[56] References Cited

U.S. PATENT DOCUMENTS

| 4,275,608 | 6/1981 | Brancolini | 74/15.63 |
|---|---|---|---|
| 4,830,159 | 5/1989 | Johnson et al. | 192/53 |
| 5,058,455 | 10/1991 | Nemoto et al. | 74/606 |
| 5,058,459 | 10/1991 | Nemoto et al. | 74/745 |

*Primary Examiner*—Dirk Wright

[57] ABSTRACT

A bearing support frame (4) is disposed within a rear end portion of a tractor front housing (1) and is fixedly supported by this housing which has an internal partition wall (1a) and an open rear end. A transmission casing (2) having an open front end is fastened to the rear of the front housing and includes a primary speed change mechanism (14) which is disposed between a drive shaft (12) and change shaft (13). These shafts are supported at their front end portions by the support frame and extend forwardly of this frame. An additional speed change mechanism (9) is disposed within a rear half of the front housing and comprises a primary shaft (7), rotatable output member (10) and countershaft (11). The output member is fixedly mounted on a front end portion of the drive shaft, and a rear end portion of the countershaft is journaled by a front end portion of the change shaft. Preferably, the support frame includes therein an annular bore portion (4c) for temporarily holding the output member in position at a preassembled condition of the additional change mechanism in the front housing.

6 Claims, 10 Drawing Sheets

TRANSMISSION ASSEMBLY FOR TRACTORS

FIELD OF THE INVENTION

This invention relates to a transmission assembly for tractors of a type having a front housing which is fastened to the front end of a transmission casing so as to form a part of the vehicle body together with this casing and within which an additional speed change mechanism is disposed at a rear half of the housing.

BACKGROUND OF THE INVENTION

Typical examples of the tractor transmission assembly of the type set forth above are disclosed in U.S. Pat. No. 5,058,455 and in U.S. Pat. No. 5,058,459. In each of the transmission assemblies disclosed in these U.S. patents, the front housing is fashioned to have an open rear end and the transmission casing is fashioned to have an open front end. A bearing support frame which is fixedly supported by the transmission casing is disposed within a rear end portion of the front housing and is used for supporting shafts of an additional speed change mechanism within the front housing and for supporting shafts of a primary speed change mechanism within the transmission casing. More specifically, each of the above-referenced transmission assemblies comprises a primary shaft which extends through an internal partition wall of the front housing. The additional speed change mechanism includes, other than a rotatable output member (a rotatable output shaft or an output gear) which is driven to rotate by the primary shaft at a variable speed of rotation, a countershaft which extends parallel to the primary shaft, whereas the primary speed change mechanism is fashioned such that it performs a speed change transmission between a drive shaft, which is driven to rotate by the above-referenced rotatable output member, and a speed change shaft which extends parallel to the drive shaft. In the transmission assembly disclosed in U.S. Pat. No. 5,058,455, the above-referenced bearing support frame is used such that it supports rear ends of the primary shaft and countershaft, which are supported at their front portions by the internal partition wall, and for supporting front ends of the drive shaft and speed change shaft. In the transmission assembly disclosed in U.S. Pat. No. 5,058,459, the bearing support frame has a frame structure composed of axially spaced integral front and rear plate-shaped portions. The front plate-shaped portion is used for supporting the primary shaft and countershaft at their front portions, whereas the rear plate-shaped portion is used for supporting a rear end of the countershaft and for supporting front ends of the drive shaft and speed change shaft.

It is intended that the additional speed change mechanism disclosed in each of the above-referenced U.S. patents is preassembled in front of the bearing support frame, which is fixedly supported by the transmission casing, in a condition such that the bearing support frame and the change mechanism supported by this frame project forwardly of the transmission casing. The preassembled additional change mechanism is then insertingly assembled into the front housing such that front portions of shafts of this change mechanism are supported as required. Such a final assembling operation of the additional change mechanism into the front housing is not necessarily carried out easily because of the required positioning of shafts. In the transmission assembly disclosed in U.S. Pat. No. 5,058,455, the preassembled additional change mechanism must be inserted into the front housing by a distance corresponding to the axial width of this change mechanism, and front portions of the primary shaft and countershaft must be positioned and supported at a location spaced largely from the rear end opening of the front housing. The bearing support frame, which is adapted to support shafts of both of the additional change mechanism and primary change mechanism, has front and rear shaft-supporting portions and, therefore, a large axial width or thickness so that the whole of the additional change mechanism inclusive the support frame is large in its axial width. In the transmission assembly disclosed in U.S. Pat. No. 5,058,459, the additional change mechanism is preassembled in front of the bearing support frame in a condition where the primary shaft has not been incorporated in this preassembled change mechanism yet. The primary shaft of a large length is then inserted through an internal partition wall of the front housing and through a shaft-supporting portion in the bearing support frame. Such an insertion of the lengthy primary shaft will make it difficult to position and support this shaft so that the final assembling operation cannot be carried out easily.

The bearing support frame employed in each of these transmission assemblies has a relatively large size and a complicated configuration. Such a bearing support frame is unfavorable for manufacturing and for compactness of the transmission. The bearing support frame shown in U.S. Pat. No. 5,058,459, which comprises front and rear plate-shaped portions, requires that components of the additional change mechanism, such as gears and the like, be placed in positions from a lateral side of the support frame so that assembling operation of the change mechanism is troublesome and time-consuming. In addition, the internal partition wall of the front housing is not used as a positive support member for the additional change mechanism.

Accordingly, a primary object of the present invention is to provide a novel transmission assembly for tractors which facilitates the assembling operation thereof, particularly a final assembling operation in which shafts are positioned and supported.

An attendant object of the invention is to provide a novel transmission assembly in which a bearing support frame disposed within a rear end portion of a tractor front housing is simple in configuration and small in size so that it reduces cost and contributes toward compactness of the transmission.

Another attendant object of the invention is to provide a novel transmission assembly in which components are arranged so as to highten the compactness of the transmission.

A further attendant object of the invention is to provide a novel transmission assembly in which the number of components is minimized so as to reduce cost.

SUMMARY OF THE INVENTION

The present invention relates to a transmission assembly for tractors which comprises: a front housing (1) including an internal partition wall (1a) and an open rear end; a transmission casing (2) including an open front end and being fastened to the rear end of the front housing; a bearing support frame (4) fixedly disposed within a rear end portion of the front housing; a primary shaft (7) extending through the partition wall and being supported by the partition wall; an additional speed change mechanism (9) disposed within the front housing at a location behind the partition wall so as to perform a speed change transmission between the primary shaft and a rotatable output member (10) which is supported by the bearing support frame, the additional speed change mechanism including a countershaft (11) which is supported by the partition wall and by the bearing support frame; and a primary speed change mechanism (14) disposed within the transmission casing so as to perform a speed change transmission between a drive shaft (12) and a speed change shaft (13) which are supported respectively at their front end portions by the bearing support frame, the drive shaft being drivenly connected to the rotatable output member.

In accordance with the present invention, the bearing support frame (4) is fixedly supported by the front housing (1). The drive shaft (12) is disposed co-axially with the rotatable output member (10) and extends forwardly of the bearing support frame (4), and the rotatable output member is fixedly mounted on the drive shaft such that the rotatable output member is supported by the bearing support frame through the drive shaft. The speed change shaft (13) is disposed co-axially with the countershaft (11) and extends forwardly of the bearing support frame (4), and a rear end portion of the countershaft is rotatably journaled by the speed change shaft such that the rear end portion of the countershaft is supported by the bearing support frame through the speed change shaft.

In the structure according to the present invention, the additional speed change mechanism (9) can be preassembled into the front housing (1) at a location behind the internal partition wall (1a) in a nearly fully assembled condition by employing the bearing support frame (4), which is adapted to be supported by the front housing, and the internal partition wall of the front housing as supports. That is, so far as the rotatable output member (10), which is adapted to be supported by the frame (4) through the drive shaft (12) of the primary change mechanism (14), can temporarily be held by any appropriate means, the additional change mechanism can be preassembled into the front housing in a nearly fully assembled condition. This can be done by placing gears and other components of the change mechanism onto the primary shaft (7) and countershaft (11) from the rear end opening of the housing at a condition where front portions of the primary shaft and countershaft are supported by the partition wall (1a), and then by fixedly securing the bearing support frame (4) to the front housing. For the purpose of temporarily holding the rotatable output member which may be fashioned into either a gear or a shaft of a relatively small length, the bearing support frame (4) preferably includes an annular bore portion (4c) for temporarily holding the rotatable output member in position.

Then, front end portions of the drive shaft (12) and change shaft (13) of the primary change mechanism (14), which has been assembled into the transmission casing (2) in advance, are passed forwards through the bearing support frame (4) by moving the transmission casing relatively toward the front housing such that the rotatable output member (10) is fixedly mounted onto a front end portion of the drive shaft, a rear end portion of the countershaft (11) is journaled by a front end portion of the change shaft, and, at the same time, front end portions of the drive shaft and change shaft are supported by the bearing support frame. The front housing and transmission casing are then fastened together.

Distance of the relative movement between the front housing and the transmission casing required for positioning and supporting shafts is satisfactorily small such that front end portions of the drive shaft (12) and change shaft (13) are passed through the bearing support frame (4) so as to project slightly forwardly of this frame, so that the final assembling operation for positioning and supporting shafts can be carried out easily. Because the rotatable output member (10) and a rear end portion of the countershaft (11) are adapted to be supported by the bearing support frame (4) through the drive shaft (12) and through the change shaft (13), respectively, only shaft-supporting portions for the drive shaft and change shaft are provided in the bearing support frame. This contributes to reducing the axial width or thickness of the bearing support frame (4) so as to reduce the above-referenced distance of the relative movement and to thereby further facilitate the final positioning and supporting of shafts. The small axial width of the bearing support frame further contributes to the compactness of the transmission in the axial direction.

Preferably, the bearing support frame (4) has a plate-shaped configuration including outer peripheral flanged portions (4a) which are adapted to be secured to the rear of the front housing (1), and an expanded central portion (4b) which extends axially inwardly of the front housing (1) and is adapted to support the drive shaft (12) and speed change shaft (13) at their front end portions. According to this structure, front end portions of the drive shaft and change shaft can be supported at an inward location in the front housing having therein a relatively large axial space so as to permit arrangement of the primary speed change mechanism (14) within the transmission casing (2) from a foremost location in this casing. Such arrangement of the primary speed change mechanism contributes to a reduction of the axial length of the transmission and, therefore, to a reduction of the axial length of the vehicle body.

For further reducing the axial length of the transmission, gears (62, 66) constituting one of the speed-change gear trains for the primary change mechanism (14) are preferably located at least partly within the expanded portion (4b) of the bearing support frame (4) so as to make use of the axial width of the bearing support frame fully.

An additional speed change mechanism which is disposed within a tractor front housing is often fashioned into a direction-reversing type which includes an idler gear and clutch means for providing a backward-directional rotation to the rotatable output member of this change mechanism, as shown, for example, in the above-referenced U.S. patents. In a preferred embodiment of the present invention, such idler gear (45) and a shifter member (51) for the clutch means are mounted on a single support shaft (42) which is supported by the internal partition wall (1a) of the front housing (1) and by the bearing support frame (4). This structure contributes to a reduction of the number of transmission components and, therefore, to a reduction of the cost.

In a further embodiment of the present invention, the drive shaft (12) is disposed co-axially with the primary shaft (7). The rotatable output member is composed of a driven gear (10) which is drivenly connected to a drive gear (39), rotatably mounted on the primary shaft (7), through the countershaft (11), through two gears (40, 41) fixedly mounted on the countershaft, and through the idler gear (45). The clutch means is composed of a double-acting clutch (50) which is mounted on a rear end portion of the primary shaft (7) and is adapted to be operated by the shifter member (51) so as to couple the drive gear (39) and driven gear (10) one at a time to the primary shaft. According to this structure, the single shifter member is satisfactorily used for reversing the traveling direction of vehicle. Further, the double-acting clutch and the driven gear as an output member contribute to a significant reduction of the axial width of the additional change mechanism.

BRIEF DESCRIPTION OF THE DRAWINGS

The present invention and its attendant advantages will become more readily apparent as the specification is considered in conjunction with the accompanying drawings, in which.

DESCRIPTION OF PREFERRED EMBODIMENTS

Figure 1:
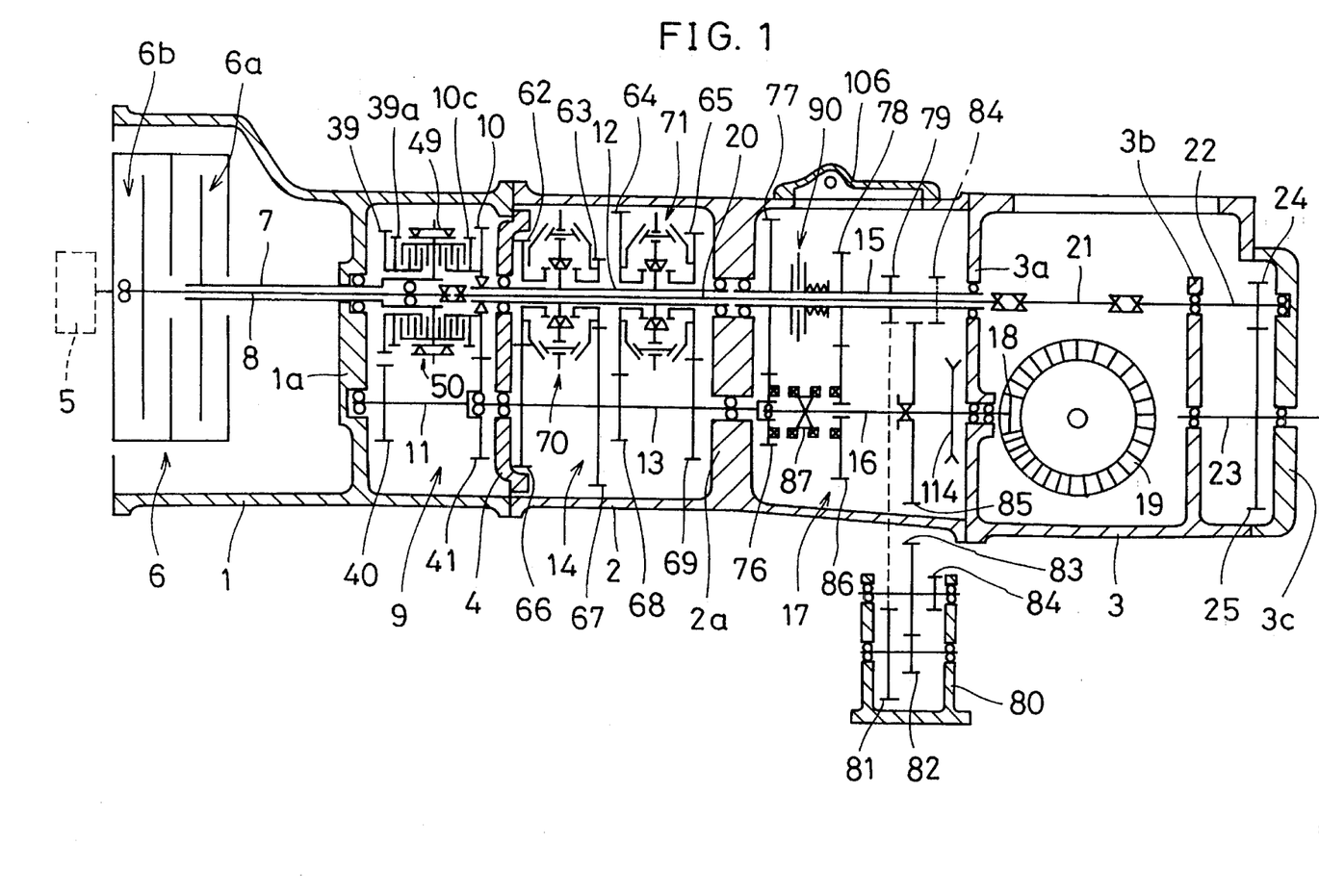
FIG. 1 is a schematic sectional side view, partially exploded, showing the whole of transmission system in a tractor in which a preferred embodiment of the transmission assembly according to the present invention is employed.

FIG. 1 shows schematically the whole of the transmission system of a tractor in which a preferred embodiment of the present invention is employed. The vehicle body of the tractor shown is composed of a front housing 1, transmission casing 2 and rear housing 3 which are arranged in series in a longitudinal direction of the tractor and are fastened together. Front housing 1 includes an open front end, an open rear end and an internal partition wall 1a. A bearing support frame 4, which is fixedly secured to a rear of the front housing 1, is disposed within a rear end portion of this housing 1. Transmission casing 2 includes an open front end, an open rear end and an internal support wall 2a. Rear housing 3 includes a front wall 3a, an internal support wall 3b which upstands from the inner bottom of this housing 3, and an open rear end which is closed by a rear end cover 3c.

As also shown in FIG. 1, engine 5 is arranged at a frontmost end of the vehicle body. Within the front housing 1, there are disposed a hollow primary shaft 7 of vehicle drive-power transmission line and a primary shaft 8 of power take-off transmission line. These shaft are driven to rotate by engine 5 through a main clutch mechanism 6. The primary shaft 7 of vehicle drive-power transmission line extends axially of the vehicle through the partition wall 1a, and the primary shaft 8 of power take-off transmission line extends through the hollow primary shaft 7. The main clutch mechanism 6 comprises a main clutch 6a of vehicle drive-power transmission line and a main clutch 6b of power take-off transmission line. These clutches are operated by individual operating mechanisms (not shown).

Within the front housing 1, an additional speed change mechanism 9 is disposed between the partition wall 1a and bearing support frame 4. This change mechanism 9 includes a driven gear 10, as a rotatable output member, which is disposed co-axially with the primary shaft 7 at a location in front of the bearing support frame 4, and a countershaft 11 which is located below the primary shaft 7. The mechanism 9 is operable to perform a speed change transmission between the primary shaft 7 and driven gear 10.

A hollow drive shaft 12 of a high level and a speed change shaft 13 of a low level are disposed within the transmission casing 2 and are supported by the bearing support frame 4 and by the support wall 2a, respectively. The drive shaft 12 is disposed co-axially with primary shaft 7, and it extends forwardly of the bearing support frame 4. The driven gear 10 is fixedly mounted on a front end portion of this drive shaft 12. Similarly, the change shaft 13 is disposed co-axially with countershaft 11 and it extends forwardly of the bearing support frame 4. The countershaft 11 is rotatably journaled at its rear end portion by a front end portion of the change shaft 13. Within a front half of the transmission casing 2, a primary speed change mechanism 14 is disposed and is operable to perform a speed change transmission between the drive shaft 12 and change shaft 13.

Within a rear half of the transmission casing 2, there are disposed a hollow intermediate shaft 15 which is located behind and co-axially with the drive shaft 12, a propeller shaft 16 which is located behind and co-axially with the change shaft 13, and an auxiliary speed change mechanism 17 which is operable to perform a speed change transmission between the change shaft 13 and propeller shaft 16. Propeller shaft 16 extends into the rear housing 3 and has, at its rear end, a small bevel gear 18 which is meshed with a larger input bevel gear 19 of a differential gearing for left and right rear wheels (both not shown) so that the vehicle is driven to travel by the drive of the left and right rear wheels.

The primary shaft 8 of power take-off line is connected to a transmission shaft 20 which extends through the hollow drive shaft 12 and intermediate shaft 15, and then to two transmission shafts 21 and 22 which are disposed in series with the rear housing 3. A PTO shaft 23, which is driven to rotate by the transmission shaft 22 through speed-reduction meshing gears 24 and 25, is supported by the support wall 3b and by the rear end cover 3c and extends rearwardly from the vehicle body.

Figure 2:
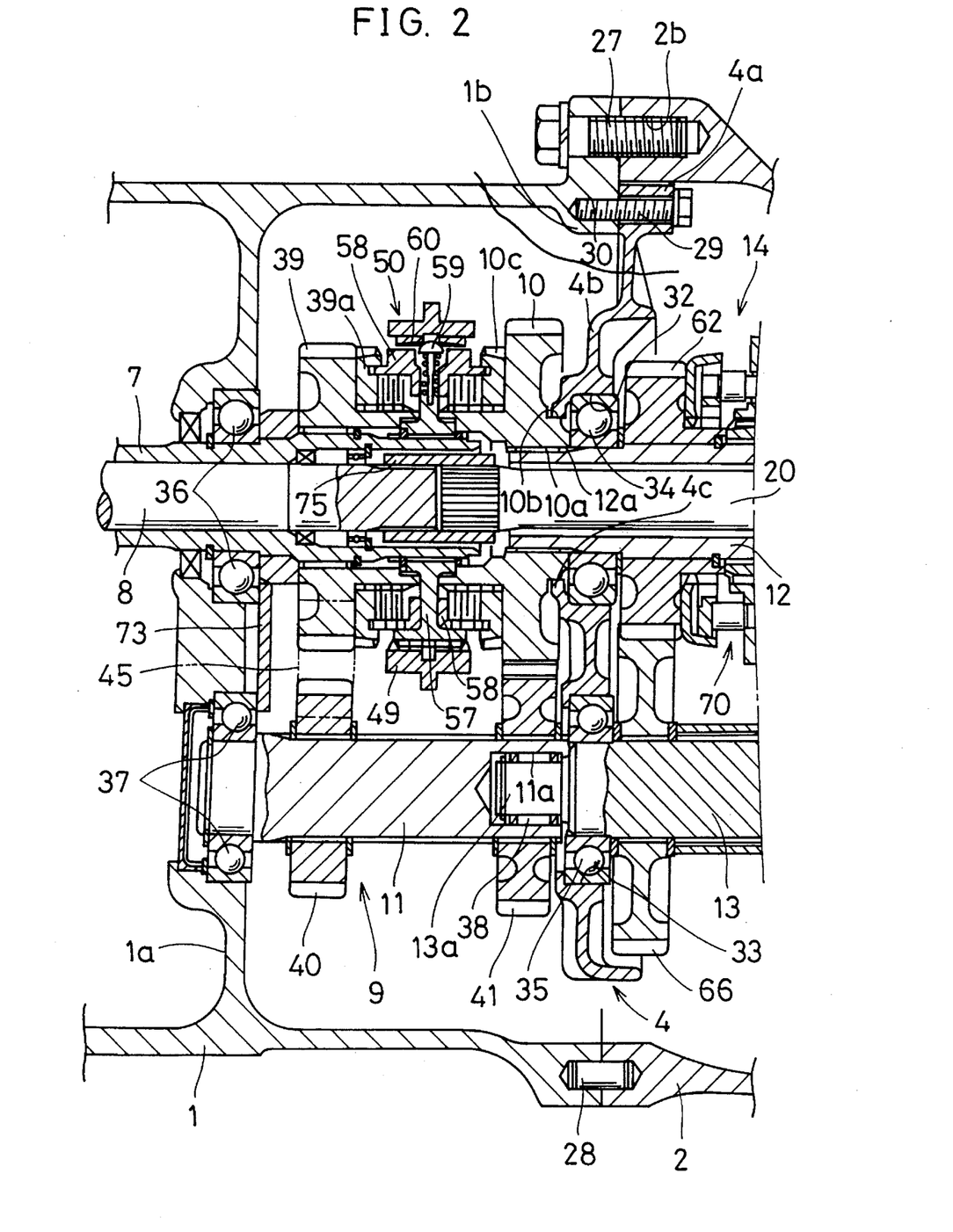
FIG. 2 is a sectional side view showing a rear half of a front housing and a front end portion of a transmission casing employed in the tractor.
Figure 3:
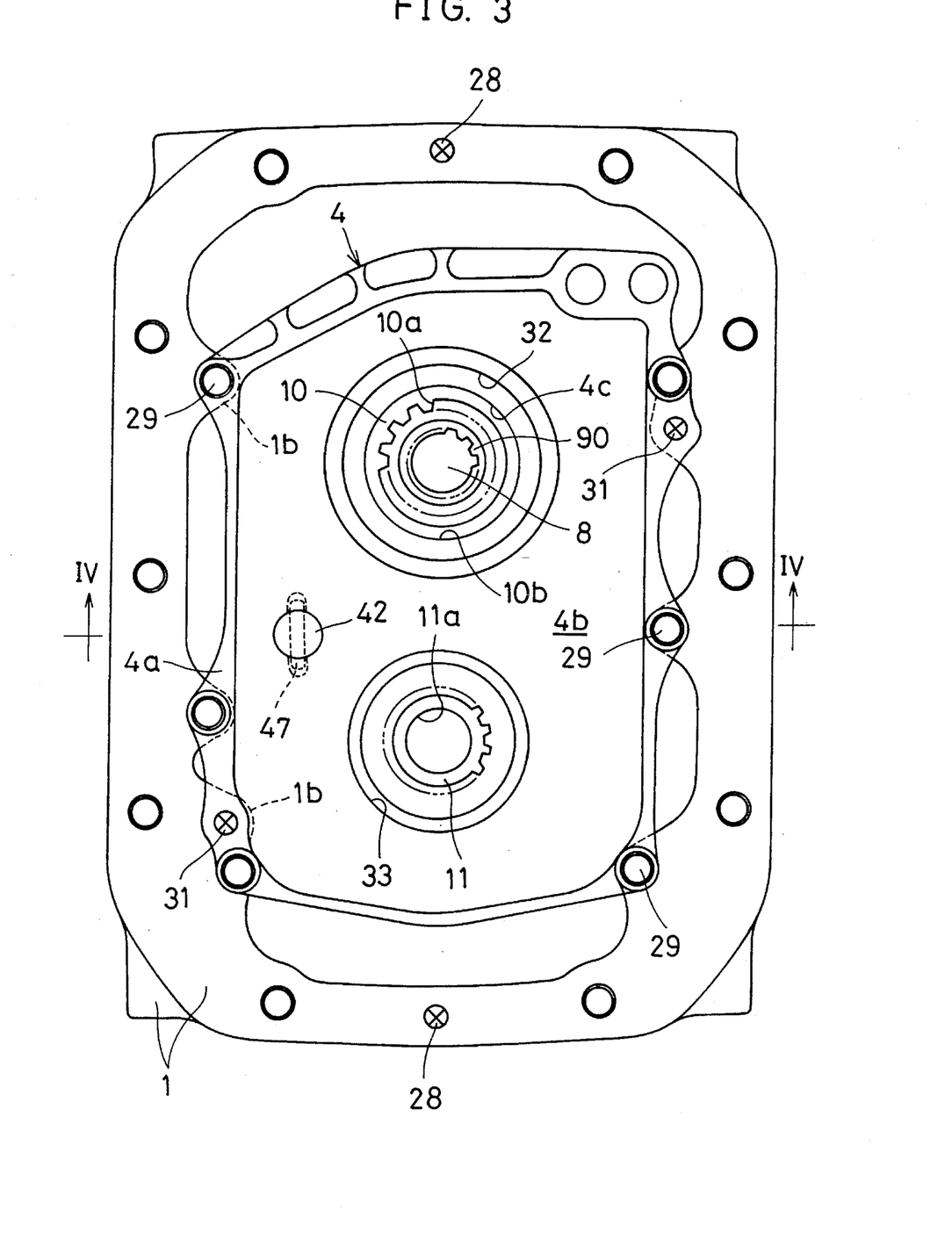
FIG. 3 is a rear view of the front housing in a condition where the transmission casing is removed from the condition shown in FIG. 2.
Figure 4:
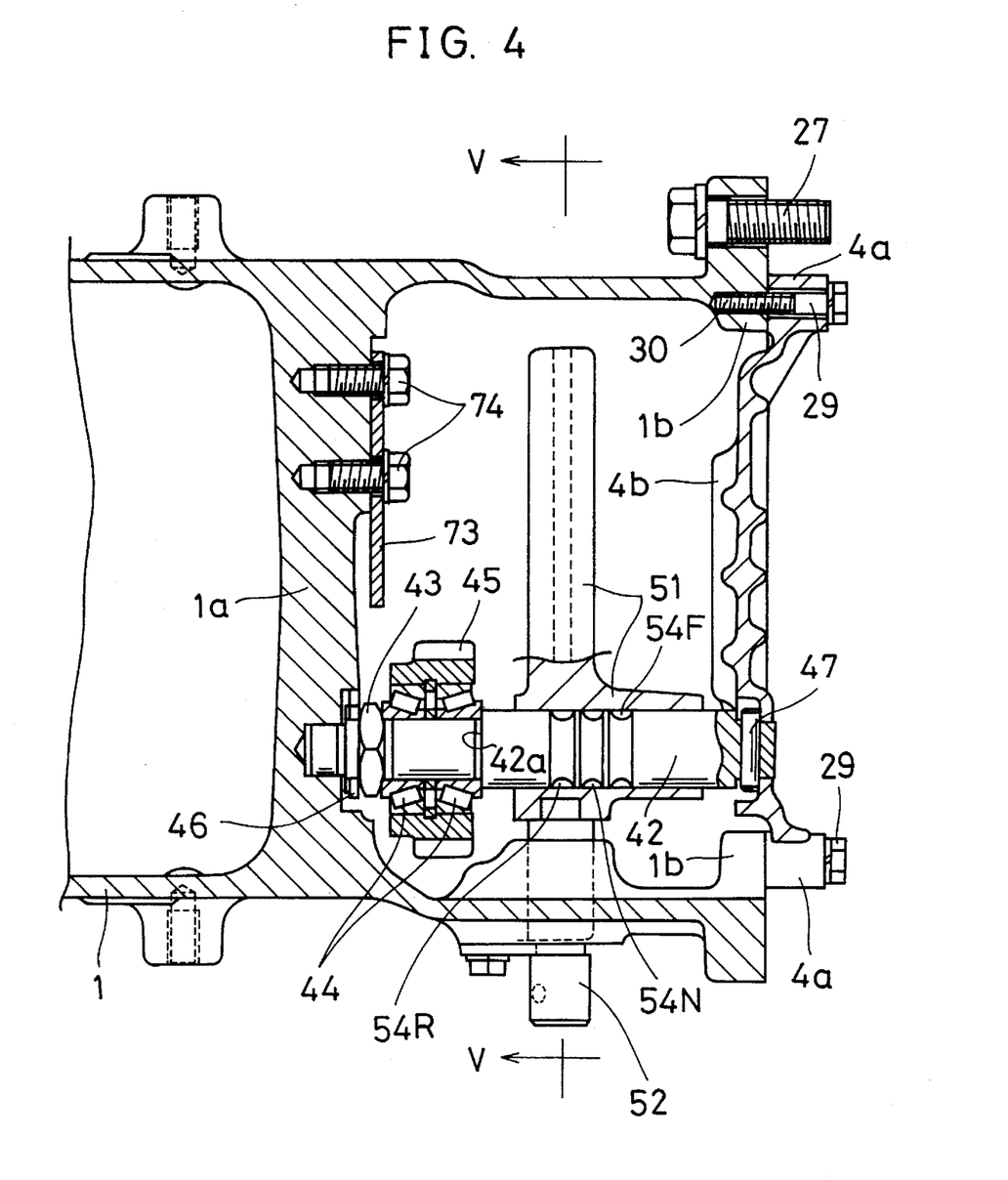
FIG. 4 is a cross-sectional view taken generally along line IV—IV of FIG. 3.

FIG. 2 illustrates a sectional side view of a rear half of the front housing 1 and a front end portion of the transmission casing 2, FIG. 3 illustrates a rear view of the front housing 1 at a state where the transmission casing 2 is removed from the state shown in FIG. 2, and FIG. 4 illustrates a cross-sectional view taken generally along line IV—IV of FIG. 3. As shown in these figures, the front housing 1 is in abutment, at its rearmost outer peripheral flange, on the front of the transmission casing 2 and is fastened to the casing using bolts 27 which extend through bores in the flange into threaded bores 2b in the transmission casing. Positioning pins 28 are employed for positioning the front housing relative to the transmission casing before they are fastened together.

As also shown in FIGS. 2 to 4, the bearing support frame 4 is of a plate-shaped configuration and includes outer peripheral flanged portions 4a for attaching the frame to the front housing 1. Almost all of the remainder portion of this frame 4 is fashioned into an expanded portion 4b which extends forwardly so as to provide a cavity or hollow space in it. The support frame 4 is attached to the rear of the front housing 1 using bolts 29 which extend through bores in the flanged portions 4a into threaded bores 30 in boss portions 1b which project inwardly from the rearmost inner surface of housing 1. Positioning pins 31 are employed for positioning the frame 4 relative to the front housing prior to the attachment of the frame. The expanded portion 4b includes two through bores for projecting or locating front ends of the drive shaft 12 and change shaft 13 in front of the bearing support frame 4. At outer peripheral ends of these two bores, annular bearing-support portions 32 and 33 are defined. Front end portions of the drive shaft 12 and change shaft 13 are supported by the bearing support frame 4 respectively through a ball bearing 34, held by the support portion 32, and through a ball bearing 35 held by the support portion 33.

As shown in FIG. 2, the primary shaft 7, which extends through the partition wall 1a, is supported by this wall 1a through a ball bearing 36. A front end portion of the countershaft 11 is supported by the partition wall 1a through a ball bearing 37. The driven gear 10, which is located in front of the bearing support frame 4, is fixedly mounted on the drive shaft 12 by a spline connection between its internal splines 10a and external splines 12a in a front end portion of the drive shaft 12, so that gear 10 is supported by the bearing support frame through drive shaft 12. The change shaft 13 includes a diameter-reduced front end portion or shaft-supporting portion 13a which is adapted to extend into an axial bore 11a formed in a rear end portion of the countershaft 11. The countershaft is rotatably journaled by the shaft-supporting portion 13a through a needle bearing 38, so that countershaft 11 is supported by the bearing support frame 4 through change shaft 13. Gear 10 includes, in its boss portion, an annular shoulder 10b. as shown in FIGS. 2 and 3, the bearing support frame 4 includes, at a location before the bearing support portion 32, an annular bore portion 4c which is nearly in contact with the annular shoulder 10b of gear 10. This annular bore portion 4c is adapted to temporarily hold the gear 10 before it is mounted fixedly on the drive shaft 12. As can be seen from FIG. 6 which illustrates an assembling stage, the annular bore portion 4c is operable to position and temporarily hold the gear 10.

The additional speed change mechanism 9 shown will be detailed hereinafter. As shown in FIG. 2, a drive gear 39 is rotatably mounted on the primary shaft 7 at a location behind the partition wall 1a. Gears 40 and 41 are fixedly mounted on the countershaft 11 and are aligned, as viewed in the axial direction of vehicle, with the drive gear 39 and with the driven gear 10, respectively. Of these gears, the rearer gear 41 is meshed directly with the driven gear 10. As shown in FIGS. 3 and 4, a support shaft 42 is disposed at an intermediate level between the primary shaft 7 and countershaft 11 and are supported by the partition wall 1a and by the bearing support frame 4. As shown in FIG. 4, an idler gear 45 is rotatably mounted on the support shaft 42 through a pair of bearings 44 which are sandwiched between an annular shoulder 42a in the outer surface of the support shaft and a nut 43 on the support shaft. A split pin 46 is attached to a front end portion of the support shaft 42 for preventing the rotation of nut 43 and for preventing the rotation of shaft 42, and a pin 47 is attached to a rear end portion of the support shaft 42 for preventing the rotation of this shaft. As schematically shown in FIG. 2, the idler gear 45 is meshed with both of the drive gear 39 and fronter gear 40 on the countershaft 11. Consequently, the driven gear 10 can be driven to rotate by the drive gear 39 through gears 45 and 40, through countershaft 11 and through gear 41.

Figure 5:
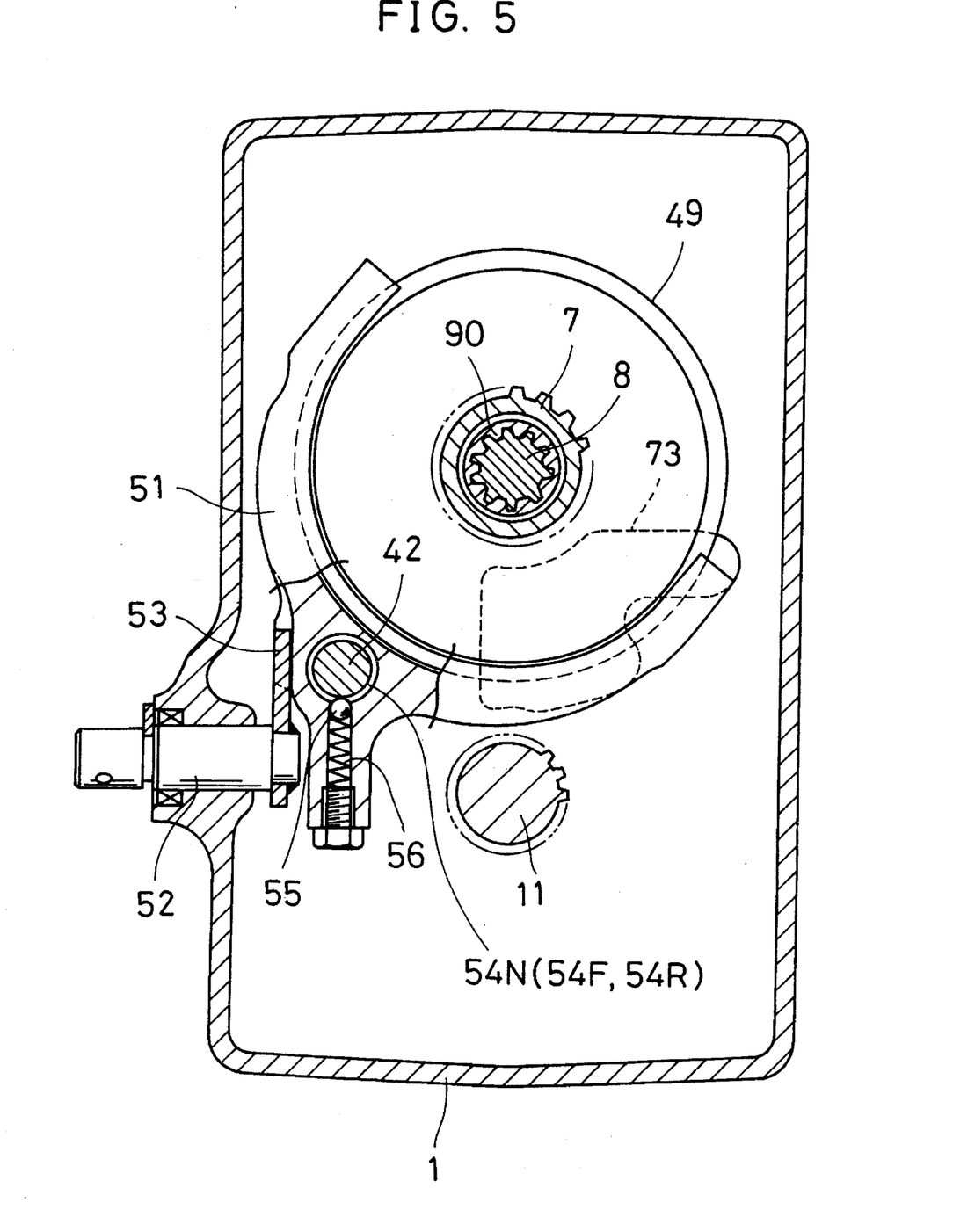
FIG. 5 is a sectional view taken generally along line V—V of FIG. 4.

As shown in FIG. 2, a double-acting synchronizer clutch 50 of a frictional disc type is mounted on a rear end portion of the primary shaft 7. This clutch 50 is operable, by the displacement of a shifting sleeve 49, to couple the drive gear 39 and driven gear 10 one at a time to the primary shaft 7. As shown in FIGS. 4 and 5, a shifter fork 51 which engages the shifting sleeve 49 is slidably mounted on the support shaft 42 such that, when the fork 51 is slidingly displaced, a sliding displacement is given to the sleeve 49. For operating the shifter fork 51, a rotatable control shaft 52 extends through a side wall of the front housing 1 and carries, at its inner end, an operating arm 53 which engages the fork 51. Control shaft 52 is operatively connected to a change lever (not shown) for switching the traveling direction of vehicle. Support shaft 42 includes, in its outer surface, latching grooves 54N, 54F and 54R for retaining the shifting sleeve 49 releaseably at a neutral position shown in FIG. 2, at a forward-directional position where the driven gear 10 is coupled to the primary shaft, and a backward-directional position where the drive gear 39 is coupled to the primary shaft, respectively. A latching ball 55 is disposed within the fork 51 and is biased by a spring 56 to project into one of the latching grooves.

The synchronizer clutch 50 shown in FIG. 2 is of the type disclosed in U.S. Pat. No. 4,830,159. The shifting sleeve 49 is spline-fitted on a splined hub 57 which is fixedly mounted on the primary shaft 7. Gears 10 and 39 are associated, respectively, with co-rotatable splined rings 10c and 39a. A synchronizer ring 58 is disposed between each ring 10c, 39a and the hub 37. A plurality of first and second frictional elements are slidably but non-rotatably supported respectively by each synchronizer ring 10c, 39a and by the boss portion of each gear 10, 39. Plural latch pins 59 are slidably supported by the splined hub 57. Further, inserts 60 with which latch pins 59 engage at their rounded heads are fitted in axial grooves formed in the inner surface of shifting sleeve 49. As detailed in the above-referenced U.S. patent, inserts 60 are adapted to control movements of the sleeve 49 and synchronizer rings 58. In operation, sleeve 49 is ultimately displaced to achieve meshment of its splines with splined ring 10c or 39a after a synchronous rotation has been attained by a full engagement between the first and second frictional elements.

Figure 7:
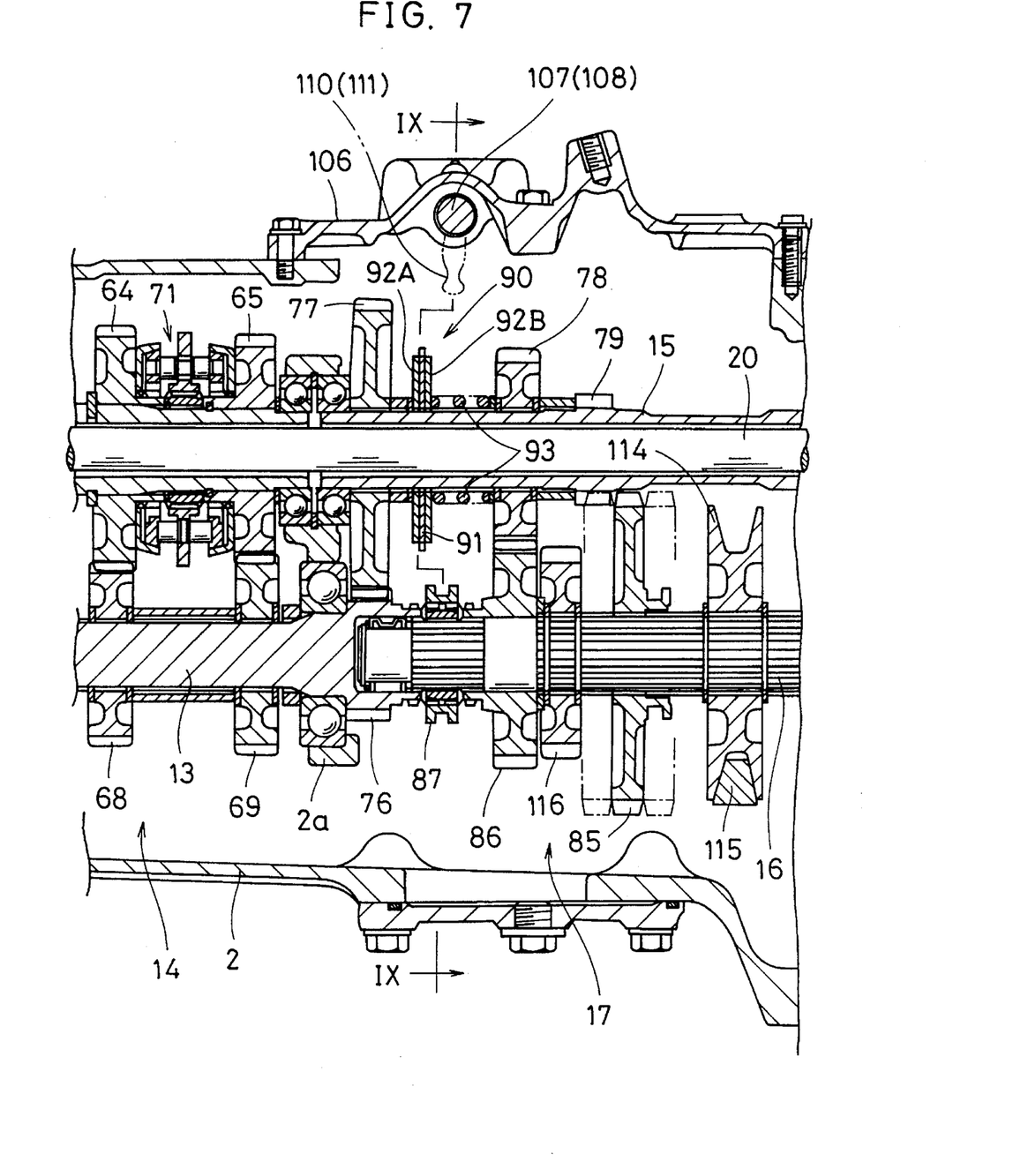
FIG. 7 is a sectional side view of a part of the transmission casing.

As shown in FIG. 1 and FIGS. 2 and 7, the primary speed change mechanism 14 includes four gears 62, 63, 64 and 65 which are rotatably mounted on the drive shaft 12, and four gears 66, 67, 68 and 69 which are fixedly mounted on the speed change shaft 13 and are meshed respectively with the gears 62–65 on the drive shaft 12. Two double-acting synchronizer clutches 70 and 71 are mounted on the drive shaft 12 at a location between gears 62 and 63 and at another location between gears 64 and 65 for selectively coupling gears 62–65 one at a time to the drive shaft. As shown in FIG. 2, gears 62 and 66 of the frontmost speed-change gear train of the four speed-change gear trains are particularly arranged such that these gears are located partly within the expanded portion 4b of the bearing support frame 4.

As shown in FIG. 2 and in FIGS. 4 and 5, a retainer plate 73 is attached to the rear surface of the partition wall 1a, using a pair of bolts 74, for preventing ball bearings 36 and 37 from getting out. As can be seen from FIGS. 2 and 3, the bearing support frame 4 of a plate-shaped configuration is sized such that it permits, at the peripheral outside of it, a free communication between the interior of the front housing 1 behind the partition wall 1a and the interior of the transmission casing 2. Lubricant oil (not shown) is contained within such interior spaces.

Figure 6:
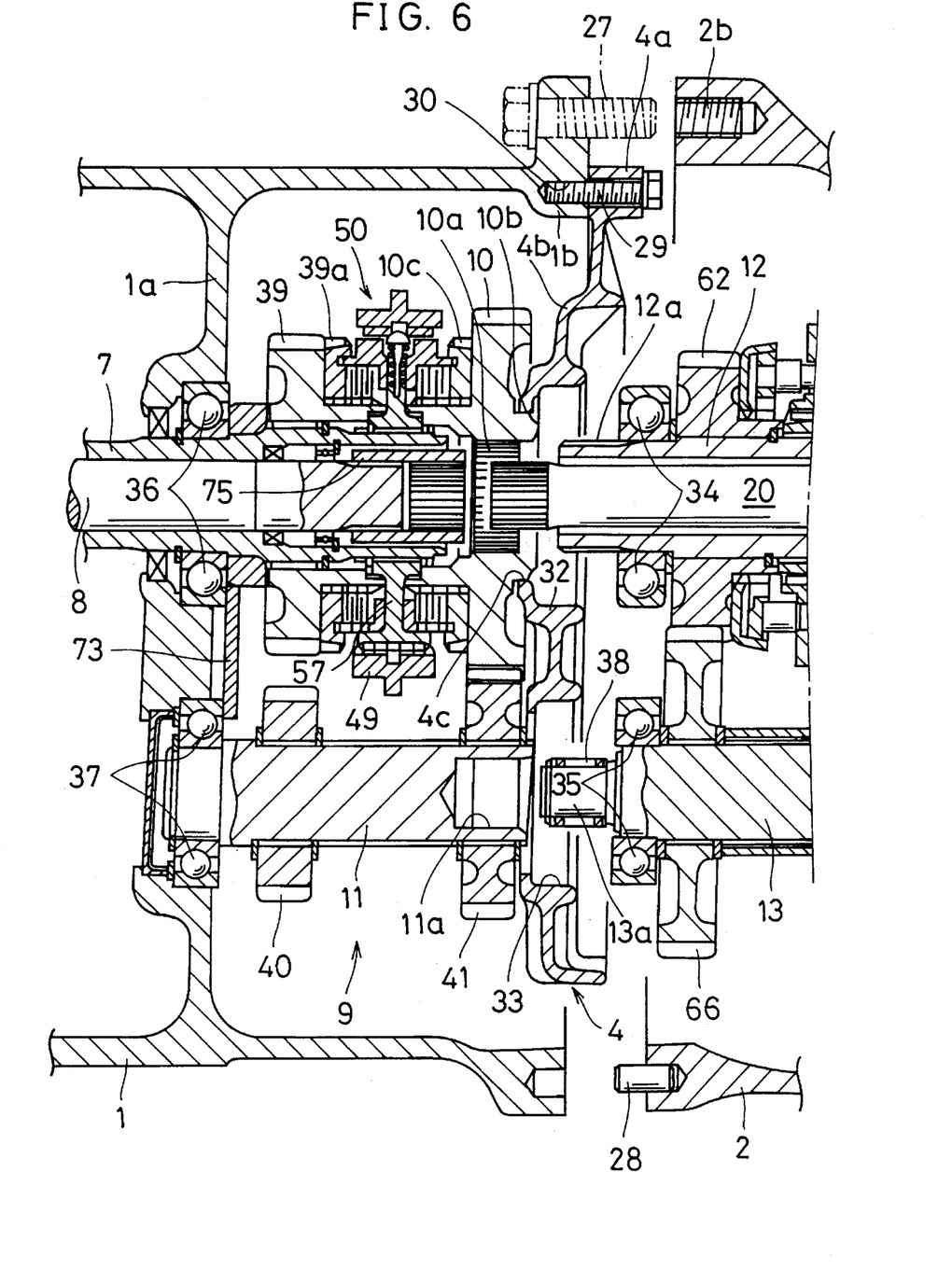
FIG. 6 is a sectional side view similar to FIG. 2 but showing an assembling stage.

FIG. 6 illustrates the method of assembly. As shown, the additional speed change mechanism 9 is preassembled fully into the front housing 1 using the partition wall 1a as a main support member and using the bearing support frame 4 as an auxiliary support member. At such a preassembled condition, the driven gear 10 is positioned and held at its annular shoulder 10b by the annular bore portion 4c in the bearing support frame 4. The primary speed change mechanism 14 is assembled in advance into a front half of the transmission casing 2 in a condition such that rear ends of the drive shaft 12 and change shaft 13 are supported by the internal support wall 2a shown in FIGS. 1 and 7. When the front housing 1 and transmission casing 2 are relatively moved toward each other from the separated condition shown in FIG. 6 and are brought into contact with each other while being positioned relatively by means of positioning pins 28, internal splines 10a of the driven gear 10 are meshed with external splines 12a of the drive shaft 12 so that the driven gear becomes fixedly mounted on a front end portion of the drive shaft. Also, the shaft-supporting front end portion 13a of the change shaft 13 becomes fitted, together with the needle bearing 38 on it, into the bore 11a in a rear end portion of the countershaft 11 so that this shaft 11 is supported at its rear end portion. Further, ball bearings 34 and 35 which are mounted previously on the drive shaft 12 and change shaft 13 become held by the annular bearing support portions 32 and 33 in the bearing support frame 4. In the transmission structure shown, the primary shaft 8 and transmission shaft 20 of power take-off transmission line are coupled to each other using a splined coupling member 75 which is disposed within a rear end portion of the hollow primary shaft 7. In assembly, the coupling member 75 is mounted at an axial half thereof previously on a rear end portion of the primary shaft 8 as shown (or alternatively, on a front end portion of the transmission shaft 20), so that coupling between the shafts 8 and 20 is attained at the same time. After that, the assembly is completed by fastening between the front housing 1 and transmission casing 2 using bolts 27.

In the transmission structure having been detailed hereinbefore, the rotatable output member of the additional speed change mechanism 9 is composed of a gear 10. Alternatively, such a rotatable output member may be a rotatable shaft of a small length having thereon a co-rotatable gear which corresponds to the gear 10. Further, gear 10 is fixedly mounted on a front end portion of the drive shaft 12 by a spline fitting using splines 10a and 12a. But a key can also be employed in place of such a spline fitting structure. Furthermore, the direction-reversing type change mechanism 9 shown may be replaced by an additional change mechanism of a high/low speed-selector type in which gears corresponding to the gears 39 and 40 are meshed directly with each other.

Figure 9:
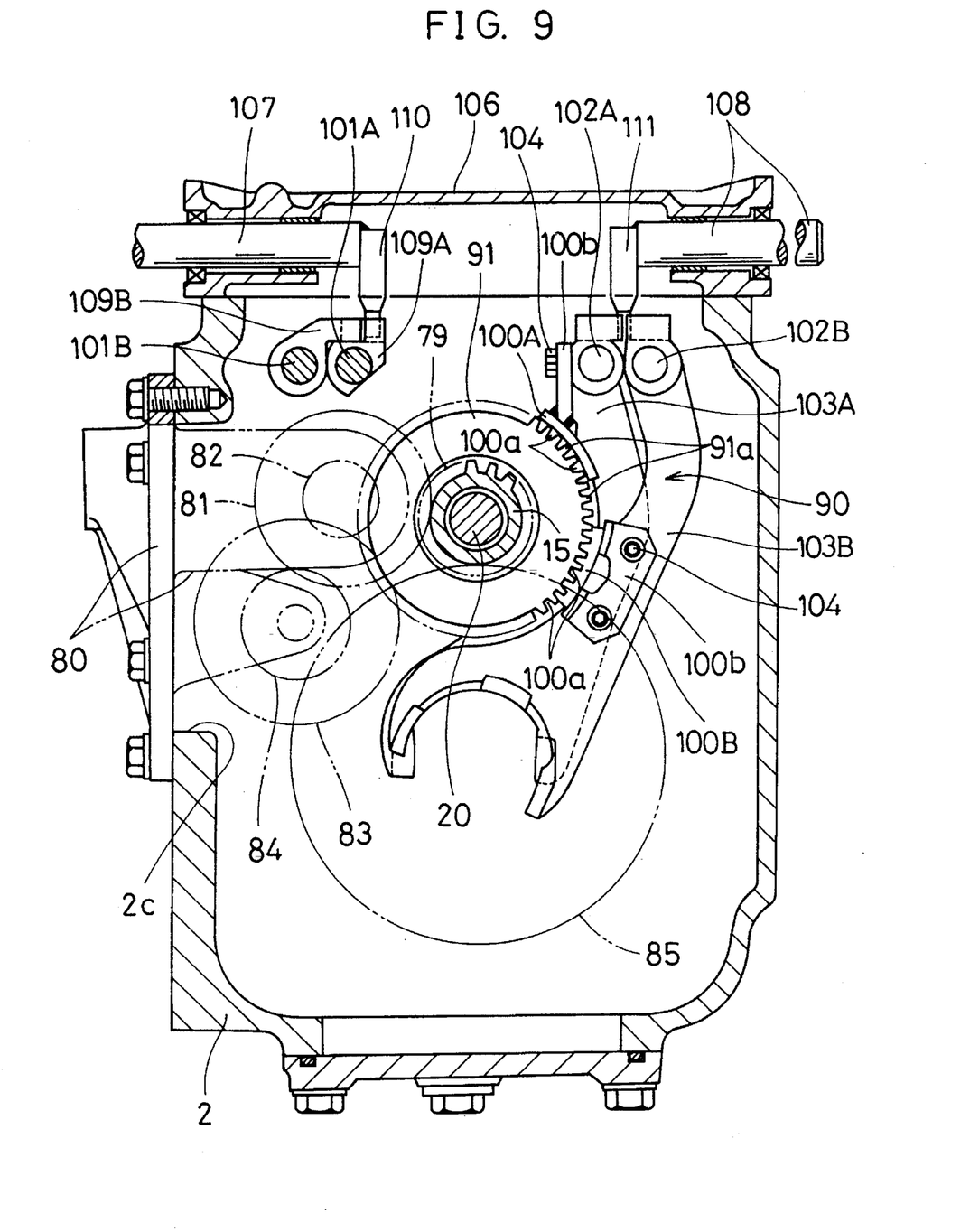
FIG. 9 is a sectional view, partially omitted, taken generally along line IX—IX of FIG. 7.

The auxiliary speed change mechanism 17 will be detailed by referring to FIGS. 1 and 7. As shown in these figures, the speed change shaft 13 is drivingly connected to the intermediate shaft 15 through a reduction gearing of meshing gears 76 and 77. Two changing gears 78 and 79 are fixedly mounted on the intermediate shaft 15. As shown in FIGS. 1 and 9, a side wall of the transmission, casing 1 includes, at a location near its rear end, an opening 2c through which a support frame 80 attached to the casing 1 extends into this casing and has a reduction gear mechanism carried thereby. The reduction gear mechanism comprises gears 81, 82, 83 and 84 which constitute a reduction gear train together with the gear 79 on the intermediate shaft 15, and is operable to transmit the rotation of gear 79 to the final gear 84 with a largely reduced speed of rotation. As shown in FIGS. 1 and 7, a shift gear 85 which is selectively meshable with gears 84 and 79 is slidably but non-rotatably mounted on the propeller shaft 16. A gear 86 which is in meshment with the gear 78 on the intermediate shaft 15 is rotatably mounted on the propeller shaft 16. Further, a clutch member 87 is slidably but non-rotatably mounted on the propeller shaft 16 and is adapted to be displaced selectively to a position where gear 86 is coupled to the propeller shaft, and to another position where propeller shaft is connected directly to the change shaft 13 by the clutch member. The auxiliary speed change mechanism 17 provides for the propeller shaft 16 a creeping rotational speed, when gears 84 and 85 are meshed, by which the vehicle is traveled at a creeping speed, a first speed when gears 79 and 85 are meshed, a second speed when gear 86 is coupled to this shaft 16 by the clutch member 87, and a third speed when shaft 16 is connected directly to the shaft 13 by the clutch member 87.

Figure 8:
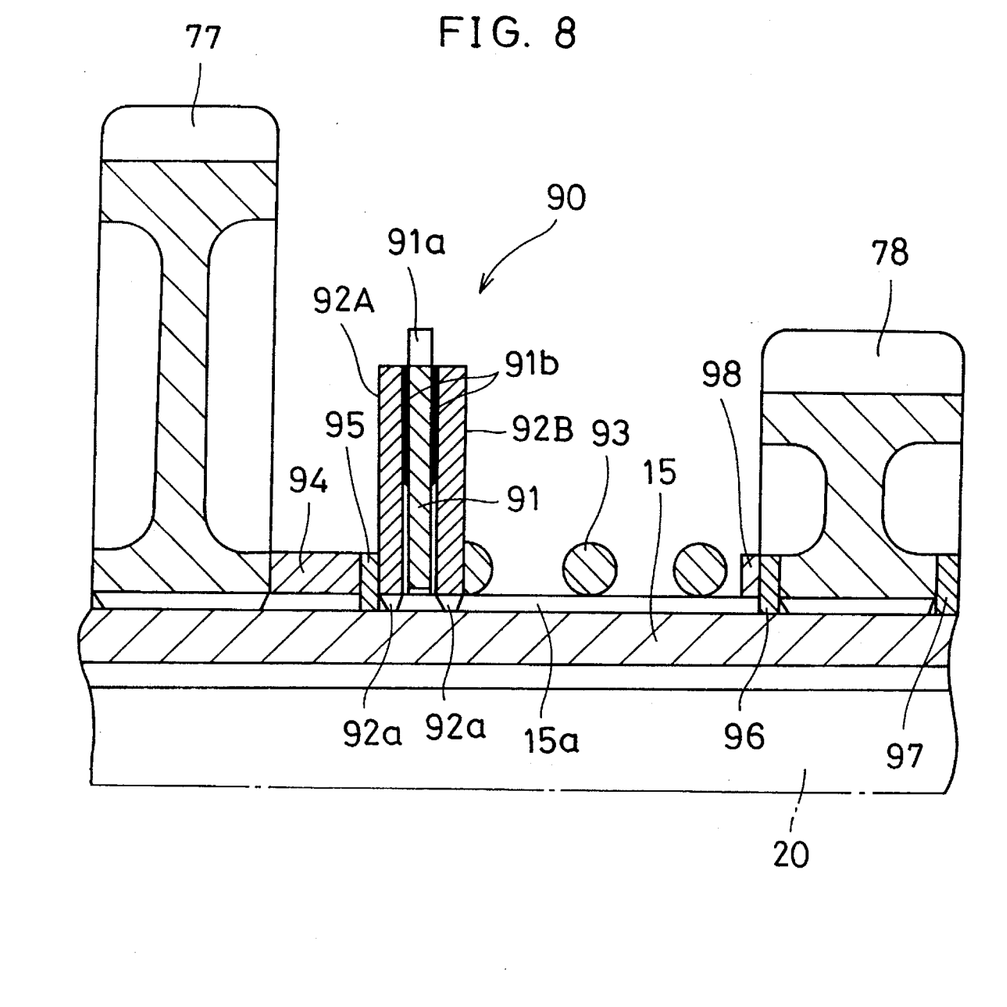
FIG. 8 is an enlarged view of a part of FIG. 7.

As shown in FIGS. 1 and 7, there is disposed between gears 77 and 78 on the intermediate shaft 15 a frictional brake mechanism 90 for braking the shaft 15 with a relatively small braking force. As shown in FIGS. 7 to 9, this brake mechanism 90 includes a wheel member 91 having in its outer periphery a plurality of tooth-shaped integral projections 91a, a pair of ring members 92A and 92B by which the wheel member 91 is sandwiched axially of the intermediate shaft, and a coil spring 93. As best seen from FIG. 8, the wheel member 91 is rotatably mounted on the intermediate shaft 15, whereas the ring members 92A and 92B are slidably but non-rotatably mounted on the intermediate shaft by meshing their internal splines 92a with splines 15a in the outer surface of shaft 15. A collar 94 and a snap ring 95 are disposed on the intermediate shaft 15 at a location behind the gear 77 for preventing this gear from displacing rearwards, and a spring-receiving ring 98 is disposed on the intermediate shaft and in abutment against one (96) of a pair of snap rings 96 and 97 for preventing the gear 78 from displacing axially. The coil spring 93 is disposed on the intermediate shaft 15 such that it is received, at its rear end, by the spring-receiving ring 98 and acts, at its front end, upon the rearer ring member 92B. Wheel member 91 has, on its both surfaces, frictional material 91b affixed thereto. Spring 93 is operable to bias the ring members 92A and 92B and wheel member 91 to move toward the snap ring 95 and to thereby cause a frictional engagement of ring members 92A and 92B with the wheel member 91. The load or force of spring 93 is predetermined such that the intermediate shaft 15 is braked with a relatively small braking force enough to prevent a rotation of this shaft and, therefore, change shaft 13 which can be caused, in a neutral condition of the primary speed change mechanism 14, by some torque which may be transmitted to the change shaft 13 from the drive shaft 12 because of a slight engagement of clutches 70 and 71 due to a drag effect by lubricant oil.

Figure 10:
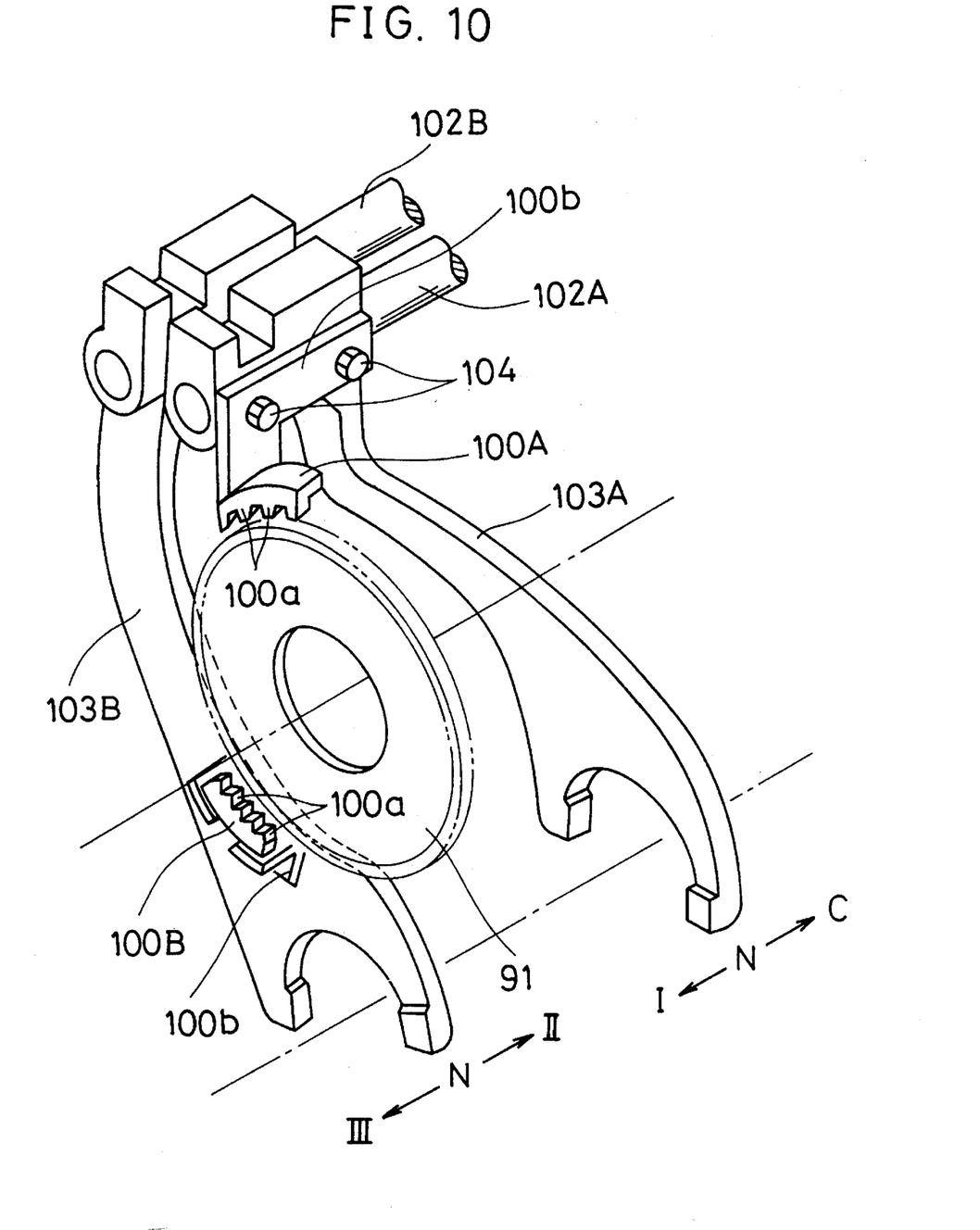
FIG. 10 is a schematic perspective view of some members shown in FIG. 9.

The frictional brake mechanism 90 further includes a pair of locking members 100A and 100B shown in FIGS. 9 and 10. Each of them comprises an arch-shaped body having, at its inner surface, plural tooth-shaped engaging projections 100a which are engageable with the projections 91a of the wheel member 91. As shown in FIGS. 7 and 9, a pair of fork-support shafts 101A and 101B and another pair of fork-support shafts 102A and 102B which extend axially of the vehicle are disposed at a high level and at one and the other sides within a rear half of the transmission casing 2. A pair of shifter forks 103A and 103B are slidably mounted on the pair of fork-support shafts 102A and 102B. These forks 103A and 103B engage, respectively, the shift gear 85 and clutch member 87 of the auxiliary speed change mechanism 17 and are operable to shift the shift gear and clutch member. The locking members 100A and 100B are attached, at their support portions 100b fixedly secured thereto, to the shifter forks 103A and 103B, respectively, using bolts 104. More specifically, these locking members are faced to the outer periphery of the wheel member 91 at levels or phases different from each other. The upper locking member 100A is attached, at its support portion 100*b,* to an upper end portion of the shifter fork 103A, whereas the lower locking member 100B is attached, at its support portion 100*b,* to an intermediate portion of the shifter fork 103B.

Consequently, the locking members 100A and 100B are displaced forwards and backwards in response to the shifting operation of the auxiliary speed change mechanism 17. In FIG. 10, there are illustrated the positions N, C, I, II and III of forks 103A and 103B which correspond to the neutral and operative positions of the shift gear 85 and clutch member 87 shown in FIG. 7. At the neutral positions N of the forks 103A and 103B shown in FIG. 10, the auxiliary speed change mechanism 17 is in its neutral position. At the creeping position C and first speed position I of the fork 103A and at the neutral position N of the fork 103B, the change mechanism 17 is in its creeping speed position and first speed position, respectively. At the second position II and third position III of the fork 103B and at the neutral position N of the fork 103A, the change mechanism 17 is in its second speed position and third speed position, respectively. The locking member 100A, which is fixedly supported by the shifter fork 103A for operating shift gear 85, is arranged such that the engaging projections 100*a* of this locking member 100A are disengaged from projections 91*a* of the wheel member 91 at the neutral position N and creeping speed position C of the fork 103A, whereas the engaging projections 100*a* are engaged with projections 91*a* at the first speed position I of the fork 103A. The locking member 100B, which is fixedly supported by the shifter fork 103B for operating clutch member 87, is arranged such that the engaging projections 100*a* of this locking member 100B are disengaged from projections 91*a* of the wheel member 91 at the neutral position N and third speed position III of the fork 103B, whereas the engaging projections 100*a* are engaged with projections 91*a* at the second speed position II of the fork 103B. Consequently, the wheel member 91 is non-rotatably locked at the first and second speed positions of the auxiliary speed change mechanism 17 and is freely rotatable at the neutral, creeping speed and third speed positions of the change mechanism 17.

As shown in FIGS. 7 and 9, the top wall of transmission casing 2 includes, in its rear half, an opening which is closed by a cover member 106. Left and right control shafts 107 and 108, which extend laterally through the cover member 106, are slidably and rotatably supported by this cover member. The fork-support shafts 101A and 101B shown in FIG. 9 are employed for operating the synchronizer clutches 70 and 71 (FIG. 2) of the primary change mechanism 14 and are supported by the support wall 2*a* shown in FIGS. 1 and 7 such that these shafts extends forwardly into a front half of the transmission casing 2. These shafts 101A and 101B carry, at their rear ends, operating members 109A and 109B. An operating pin 110 is fixedly secured to the inner end of control shaft 107 of one side such that this pin can be engaged selectively with one of the operating members 109A and 109*b* by a selective sliding displacement of the control shaft 107. Then, shaft 107 is rotationally displaced so as to provide a sliding displacement to one of the fork-support shafts which carries operating member 109A or 109B engaged by the operating pin 110. Another operating pin 111 is fixedly secured to the inner end of control shaft 108 of the other side such that this pin can be engaged selectively with one of the shifter forks 103A and 103B for the auxiliary change mechanism 17 by a selective sliding displacement of the control shaft 108. Then, shaft 108 is rotationally displaced so as to provide a sliding displacement to one of the shifter forks which is engaged by the operating pin 111. The control shafts 107 and 108 are operatively connected, respectively, to a primary change lever and to an auxiliary change lever (both not shown).

The frictional brake mechanism 90 having been detailed by referring to FIGS. 7 to 10 operates as follows: Even when the vehicle is parked at a condition where both of the double-acting synchronizer clutches 70 and 71 are disengaged so that the primary change mechanism 14 is in its neutral position, the clutches 70 and 71 can transmit some torque from the drive shaft 12 to the change shaft 13 because of a slight engagement of these clutches due to a drag effect by lubricant oil, so that an unexpected start of the vehicle may be caused. In the first and second speed positions of the auxiliary change mechanism 17, the wheel member 91 is locked, as described above, so that the frictional brake mechanism 90 operates to apply a relatively small braking force to the intermediate shaft 15 and, therefore, to the propeller shaft 16. Consequently, when the vehicle is parked at the neutral condition of primary change mechanism 14 while the auxiliary change mechanism 17 remains in its first or second speed position, rotation of the propeller shaft 16 due to the transmission of some torque resulting from the drag effect in the clutches 70 and 71 is not caused so that the problem of an unexpected start of the vehicle is eliminated.

In each of the neutral, creeping speed and third speed positions of the auxiliary change mechanism 17, the wheel member 91 is unlocked so as to be freely rotatable with rings 92A and 92B so that the frictional brake mechanism 90 does not provide any braking force for the intermediate shaft 15. In the neutral position of the auxiliary change mechanism 17, the vehicle-drive power transmission path is interrupted by this change mechanism so that the above-referenced problem of an unexpected start of the vehicle does not exist originally. In a condition where the vehicle is parked in the neutral position of the primary change mechanism 14 while the auxiliary change mechanism 17 remains in its high speed position where speed reduction ratio by this change mechanism is small, torque transmitted through the auxiliary change mechanism due to some engagement of clutches 70 and 71 caused by the lubricant-drag effect is not large enough to effect the start of vehicle. Consequently, when the vehicle is parked in the neutral position of the primary change mechanism 14 while the auxiliary change mechanism 17 remains in its high or third speed position where the speed reduction ratio is small (zero in the embodiment shown), an unexpected start of the vehicle is not caused though no braking force is applied to the intermediate shaft 15. In a condition where the vehicle is traveled at the third speed position of the auxiliary change mechanism 17, energy loss due to a braking action of the frictional brake mechanism 90 is not caused because this brake mechanism does not apply any braking force to the intermediate shaft 15 and, therefore, to the propeller shaft 16 which is now connected to the intermediate shaft through the reducing gears 76 and 77 and through the clutch member 87.

Under a condition where the vehicle is parked at the neutral position of the primary change mechanism 14 while the auxiliary change mechanism 17 remains in its creeping speed position, torque which may be applied from the side of rear wheels (not shown) could be confined between the intermediate shaft 15 and rear wheels if the shaft 15 were braked by the frictional brake mechanism 90. And, such confined torque could make it hard to release the shift gear 85 from meshment with gear 84 and, therefore, to carry out the shifting operation of the auxiliary change mechanism 17. The frictional brake mechanism 90 shown does not cause such a difficulty in the shifting operation because it does not brake the intermediate shaft 15 at the creeping speed position of the auxiliary change mechanism 17. In a condition where the vehicle is traveled at a creeping speed, energy loss due to a braking action of the brake mechanism 90 is not caused as in the case of the third speed position of the change mechanism 17.

As can be appreciated now, the frictional brake mechanism 90 is fashioned such that a rotatable wheel member 91 is particularly provided as a brake element with which another brake element or ring member 92A, 92B co-rotatable with a transmission shaft 15 to be braked is frictionally engaged, and such that the wheel member 91 is adapted to be locked non-rotatably by a shifting mechanism for the auxiliary speed change mechanism 17 only at particular positions of this change mechanism so as to brake shaft 15 with a relatively small braking force. This brake mechanism 90 solves the problem of an unexpected start of the vehicle, under a condition where the primary change mechanism 14 is placed in its neutral position, with a simple structure such that it also copes with the problem of energy loss resulting from a frictional braking action during the travel of vehicle and with a possible difficulty in the shifting operation of the auxiliary change mechanism. The wheel member 91 may have a single projection on its outer periphery in place of the plural projections 91a shown, and each of the locking members 100A and 100B may correspondingly include a single engaging projection. The coil spring 93 shown may be replaced by a leaf spring or leaf springs.

In FIGS. 1 and 7, numeral 114 designates a V-shaped pulley which constitutes a parking brake in combination with a braking band 115 which in turn is entrained over the pulley, as shown in FIG. 7. In FIG. 7, numeral 116 designates a gear (omitted in FIG. 1) which is fixedly mounted on the propeller shaft 16 preparing for taking-off front wheel-drive power when the two wheel-drive transmission shown is converted to a four wheel-drive transmission.

While a preferred embodiment of the invention has been described, it will be appreciated that various modifications and changes may be made without departing from the spirit and scope of the appended claims.

We claim:

1. A transmission assembly for tractors which comprises: a front housing (1) including an internal partition wall (1a) and an open rear end; a transmission casing (2) including an open front end and being fastened to the rear end of said front housing; a bearing support frame (4) fixedly disposed within a rear end portion of said front housing; a primary shaft (7) extending through said partition wall and being supported by said partition wall; an additional speed change mechanism (9) disposed within said front housing at a location behind said partition wall so as to perform a speed change transmission between said primary shaft and a rotatable output member (10) which is supported by said bearing support frame, said additional speed change mechanism including a countershaft (11) which is supported by said partition wall and by said bearing support frame; and a primary speed change mechanism (14) disposed within said transmission casing so as to perform a speed change transmission between a drive shaft (12) and a speed change shaft (13) which are supported respectively at their front end portions by said bearing support frame, said drive shaft being drivenly connected to said rotatable output member, the improvement characterized in:

that said bearing support frame (4) is fixedly supported by said front housing (1);

that said drive shaft (12) is disposed co-axially with said rotatable output member (10) and extends forwardly of said bearing support frame (4), said rotatable output member being fixedly mounted on said drive shaft such that said rotatable output member is supported by said bearing support frame through said drive shaft; and that said drive speed change shaft (13) is disposed co-axially with said countershaft (11) and extends forwardly of said bearing support frame (4), a rear end portion of said countershaft being journaled by said speed change shaft such that the rear end portion of said countershaft is supported by said bearing support frame through said speed change shaft.

2. The transmission assembly as set forth in claim 1, wherein said bearing support frame (4) includes an annular bore portion (4c) for temporarily holding said rotatable output member (10) in position.

3. The transmission assembly as set forth in claim 1, wherein said bearing support frame (4) has a plate-shaped configuration including outer peripheral flanged portions (4a) which are adapted to be secured to the rear of said front housing (1), and an expanded central portion (4b) which extends axially inwardly of said front housing (1) and is adapted to support said drive shaft (12) and said speed change shaft (13) at their front end portions.

4. The transmission assembly as set forth in claim c, wherein said primary speed change mechanism (14) comprises plural speed-change gear trains which are disposed between said drive shaft (12) and said speed change shaft (13), gears (62, 66) of one of said speed-change gear trains being located at least partly within said expanded portion (4b).

5. The transmission assembly as set forth in claim 1, wherein said additional speed change mechanism (9) includes an idler gear (45) and clutch means (50) for providing a backward-directional rotation to said rotatable output member (10), said idler gear and a shifter member (51) for said clutch means being mounted on a single support shaft (42) which is supported by said partition wall (1a) and by said bearing support frame (4).

6. The transmission assembly as set forth in claim 5, wherein said drive shaft (12) is disposed co-axially with said primary shaft (7), wherein said rotatable output member is composed of a driven gear (10) which is drivenly connected to a drive gear (39), rotatably mounted on said primary shaft (7), through said countershaft (11), through two gears (40, 41) fixedly mounted on said countershaft, and through said idler gear (45), and wherein said clutch means is composed of a double-acting clutch (50) which is mounted on a rear end portion of said primary shaft (7) and is adapted to be operated by said shifter member (51) so as to couple said drive gear (39) and said driven gear (10) one at a time to said primary shaft.

\* \* \* \* \*

UNITED STATES PATENT AND TRADEMARK OFFICE
CERTIFICATE OF CORRECTION

PATENT NO.   : 5,570,605
DATED        : November 5, 1996
INVENTOR(S)  : Hiroshi Kitagawara et al.

It is certified that error appears in the above-indentified patent and that said Letters Patent is hereby corrected as shown below:

In claim 4, column 14, line 31, delete "c" and substitute therefor -- 3 --.

Signed and Sealed this

Twenty-first Day of January, 1997

Attest:

BRUCE LEHMAN

Attesting Officer

Commissioner of Patents and Trademarks